United States Patent [19]
Oaki et al.

[11] Patent Number: 5,230,838
[45] Date of Patent: Jul. 27, 1993

[54] FINE BUBBLE GENERATING APPARATUS

[75] Inventors: Hiroshi Oaki; Hiroshi Sasaki, both of Hiratsuka, Japan

[73] Assignee: Kabushiki Kaisha Komatsu Seisakusho, Tokyo, Japan

[21] Appl. No.: 721,499

[22] PCT Filed: Nov. 16, 1990

[86] PCT No.: PCT/JP90/01504
§ 371 Date: Sep. 4, 1991
§ 102(e) Date: Sep. 4, 1991

[87] PCT Pub. No.: WO91/07222
PCT Pub. Date: May 30, 1991

[30] Foreign Application Priority Data

Nov. 17, 1989 [JP] Japan ................................. 1-299413

[51] Int. Cl.⁵ .................................................. B01F 3/04
[52] U.S. Cl. ................................................ 261/122.1
[58] Field of Search ...................................... 261/122.1

[56] References Cited

U.S. PATENT DOCUMENTS

| | | | |
|---|---|---|---|
| 3,439,807 | 4/1969 | Danjes | 261/122 |
| 3,711,072 | 1/1973 | Waldenville | 261/122 |
| 3,911,068 | 10/1975 | Hamilton | 261/122 |
| 3,926,810 | 12/1975 | Gudernatsch et al. | 261/122 |
| 4,749,654 | 6/1988 | Karrer et al. | 261/122 |
| 4,950,431 | 8/1990 | Rudick et al. | 261/122 |
| 4,971,836 | 11/1990 | Fukasawa et al. | 261/122 |

FOREIGN PATENT DOCUMENTS 50-132568 10/1975 Japan.
63-264127 11/1988 Japan.

Primary Examiner—Tim Miles
Attorney, Agent, or Firm—Armstrong, Westerman, Hattori, McLeland & Naughton

[57] ABSTRACT

A fine bubble generating apparatus aiming at reducing diameters of bubbles generated through outer surface of a hollow fiber by giving a running speed to liquid contacting the surface of the fiber without utilizing mechanical power developed by a pump or the like. The fine bubble generating apparatus comprises a cylindrical device (1, 4 or 11) which is open in the upper and lower ends thereof and disposed in a liquid stored in a liquid vessel (8), the lower of the cylindrical device spaced apart from the inner surface of the bottom of the vessel; a passage (6 or 6a) which is narrow in width and formed inside the cylindrical device so as to extend vertically and whose upper and lower ends are open; a hollow fiber (3) which has a predetermined length and is inserted and held in the passage so as to be spaced apart from the inner surface of the passage and whose leading end is blocked; and a pressurized gas supply pipe connected to an open base end of the hollow fiber to supply pressurized gas into the interior of the fiber.

5 Claims, 5 Drawing Sheets

FIG.2
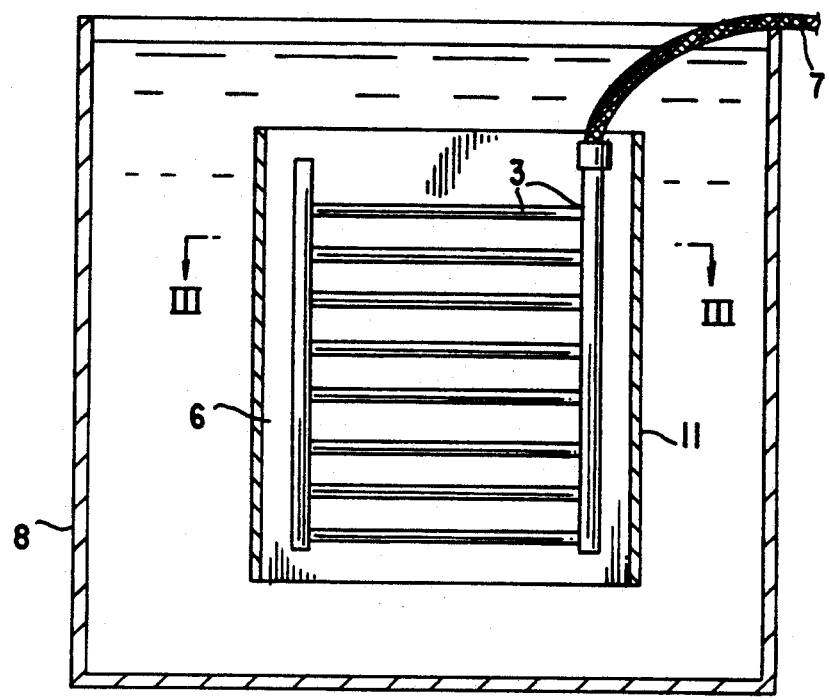
FIG.3
FIG.4
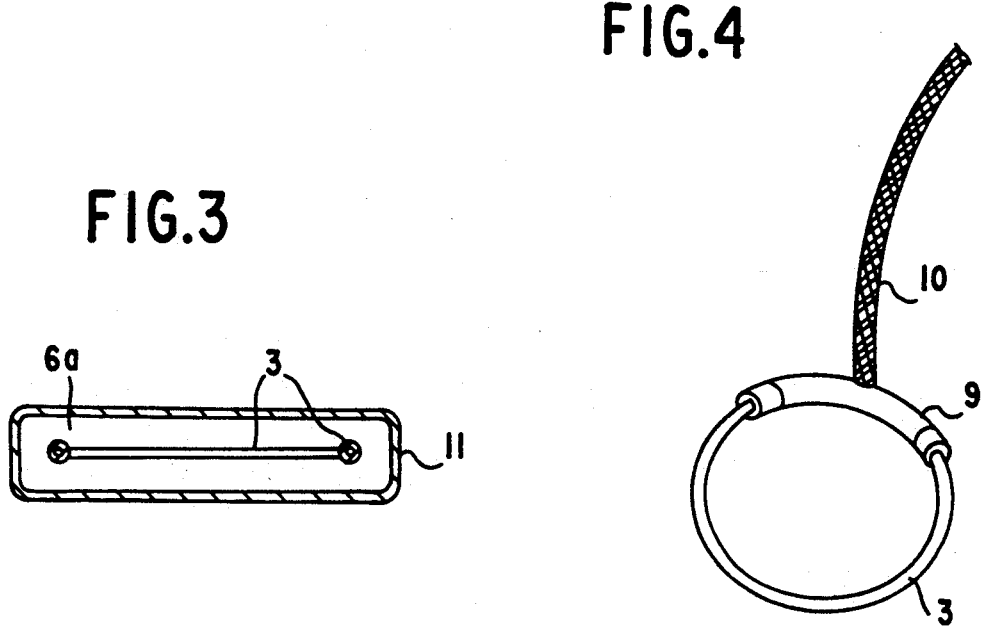

FINE BUBBLE GENERATING APPARATUS

TECHNICAL FIELD OF THE INVENTION

The present invention relates to a fine bubble generating apparatus for use in a chemical reaction system utilizing contact between a gas and a liquid such as a bubbling column or the like; a separation device for separating suspension or oily matters utilizing air floatation method, or foam separation method; and an aeration system for supplying dissolved oxygen, and more particularly to a fine bubble generating apparatus using a hollow fiber.

As a method for generating bubbles in a liquid, a method for generating bubbles by depressurizing a pressurized liquid to vary the dissolubility of gas physically has been used most commonly. This method is used, for example, in dissolved air floating method (pressurized air floatation method) for water treatment. For example, in an article entitled "Comparison between Dissolved Air Floatation Method and Method of separation by Settlement using a Floatation Tester" authored by Kenji Tanpo and others in Water Supply Association's publication VOL. 53, NO. 12 (NO. 603), there is reported an experiment wherein air is dissolved into pressurized water (4 kg/cm$^2$ G) and is depressurized to the ambient pressure (0 kg/cm$^2$ G) to generate bubbles and bubble size distribution thereof is measured. It is reported that the means bubble diameter in this case was 0.055 mm, and the diameter of big bubbles was about 0.08 mm, while that of small ones was about 0.03 mm.

Whilst, in a method for generating bubbles by supplying a pressurized gas to a conventional gas disperser made of a porous solid material or the like, fine bubbles having the above-mentioned small diameters could not be generated.

On the other hand, a method of generating fine bubbles by using a hollow fiber made of a polymer has recently been developed and become to be put to practical use.

This method renders it possible to generate fine bubbles whose diameters are equivalent to those of bubbles generated by depressurization of pressurized water by supplying a pressurized gas into the interior of a hollow fiber to give a running speed to liquid contacting the outer surface of the fiber.

It is hitherto known to give relative motion between the hollow fiber and the liquid contacting the outer surface of the fiber as mentioned above so as to separate bubbles generated through fine holes of the fiber before they grow up into large sizes on the surface of the fiber thereby generating fine bubbles of diameters less than those of bubbles generated in case no relative motion occurs between the fiber and the surrounding liquid. However, it is required to use a mechanical power generating device such as, for example, a pump to give relative motion between the hollow fiber and the surrounding liquid, therefore, a high running cost is required.

Further, in the above-mentioned field of application, for example, a cultivating device, there is a possibility of a cell, or a microorganism being damaged by mechanical agitation by means of a pump or the like, and also in other fields of application, because of higher cost of power for the pump, or the like than that for the conventional system using a gas disperser, the above-mentioned method was sometimes inapplicable.

SUMMARY OF THE INVENTION

The present invention has been devised in view of the above-mentioned circumstances in the prior art and has for its object to provide a fine bubble generating apparatus capable of reducing diameters of bubbles generated through the outer surface of a hollow fiber by giving a running speed to a liquid contacting the fiber without using mechanical power generated by a pump or the like.

Another object of the present invention is to provide a fine bubble generating apparatus arranged so as to give less damage to a cell, or a microorganism in a liquid vessel, in case the apparatus is used as a dissolved oxygen supply device for use in a system for cultivating and breeding a cell, a microorganism, an animal or a plant.

To achieve the above-mentioned objects, according to a first aspect of the present invention, there is provided a fine bubble generating apparatus, comprising: a cylindrical device which is open in the upper and lower ends thereof and disposed in a liquid stored in a vessel, with the lower end of the cylindrical device spaced apart from the inner surface of the bottom of the vessel; a passage which is narrow in width and formed inside the cylindrical device so as to extend vertically and whose upper and lower ends are open; a hollow fiber which has a predetermined length and is inserted and held in the passage so as to be spaced apart from the inner surface of the passage and whose leading end is blocked; and a pressurized gas supply pipe connected to an open base end of the hollow fiber to supply pressurized gas into the interior of the fiber.

According to a second aspect of the present invention, there is provided a fine bubble generating as set forth in the above-mentioned first aspect, characterized in that the hollow fiber is disposed at an angle of 5 to 90 degrees relative to the longitudinal direction of the passage.

According to a third aspect of the present invention, there is provided a fine bubble generating apparatus as set forth in the above-mentioned first aspect, characterized in that the cylindrical device comprises an inner cylinder and an outer cylinder disposed coaxially so as to define said passage in annular form between the outer surface of the inner cylinder and the inner surface of the outer cylinder, the hollow fiber being disposed spirally in the annular passage so as to extend in the direction from the upper part of the inner cylinder to the lower part thereof.

According to a fourth aspect of the present invention, there is provided a fine bubble generating apparatus as set forth in the above-mentioned third aspect, characterized in that the inner cylinder is formed airtightly by blocking up the upper and lower ends thereof, the hollow fiber being connected through the air-tight inner cylinder to the pressurized air supply pipe.

According to a fifth aspect of the present invention, there is provided a fine bubble generating apparatus as set forth in any one of the above-mentioned first to four aspects, characterized in that the passage in which the hollow fiber is inserted and held is formed in a liquid stored in a liquid vessel for use in an apparatus for cultivating and breeding a cell, a microorganism, an animal or a plant, so as to extend vertically with the lower end of the passage being spaced apart from the bottom surface of the liquid vessel.

According to a sixth aspect of the present invention, there is provided a fine bubble generating apparatus as set forth in the above-mentioned first aspect, characterized in that the hollow fiber is formed in the shape of a ladder comprised of two vertical columnar portions located on both sides thereof and a plurality of horizontal portions extending between the columnar portions and connected thereto, the ladder-shaped hollow fiber having a generally rectangular sectional shape and being inserted and held in a cylindrical member whose upper and lower ends are open so as to define said passage around the fiber.

According to a seventh aspect of the present invention, there is provided a fine bubble generating apparatus as set forth in the above-mentioned sixth aspect, characterized in that a pressurized gas supply pipe is connected to one end of one of the columnar portions of the ladder shaped hollow fiber.

According to an eighth aspect of the present invention, there is provided a fine bubble generating apparatus as set forth in the above-mentioned sixth aspect, characterized in that a pressurized gas supply pipe is connected to one end of each of the two columnar portions of the ladder-shaped hollow fiber.

According to the present invention incorporating each of the above-mentioned aspects, the liquid in the liquid vessel is circulated by air light phenomenon only by supplying pressurized air into the interior of the hollow fiber of the fine bubble generating apparatus disposed in the liquid vessel to allow the hollow fiber to be exposed to the circulating liquid flow to thereby enable the liquid surrounding the fiber to be afforded a running speed without utilizing mechanical power developed by a pump or the like. Consequently, fine bubbles can be generated through the surface of the hollow fiber without utilizing mechanical power developed by the pump or the like, thus enabling the running cost to be reduced significantly.

Further, the circulation of the liquid in the liquid vessel by the fine bubble generating apparatus according to the present invention is conducted more slowly than the agitation made by using mechanical power developed by the pump or the like. Therefore, in case the fine bubble generating apparatus of the present invention is used as a dissolved oxygen supply device for use in an apparatus for cultivating and breeding a cell, a microorganism, an animal or a plant, an effect is obtained in that a cell, a microorganism, etc. is given less damage.

The above-mentioned and other objects, aspects and advantages of the present invention will become apparent to those skilled in the art by making reference to the following description and the accompanying drawings in which preferred embodiments incorporating the principles of the present invention are shown by way of example only.

BRIEF DESCRIPTION OF THE DRAWINGS

FIG. 2 is a schematic, sectional view showing another embodiment of the present invention;

FIG. 3 is a sectional view taken along line III—III in FIG. 2;

FIG. 4 is a schematic, perspective view showing a comparative example;

DETAILED DESCRIPTION OF PREFERRED EMBODIMENTS

Figure 1:
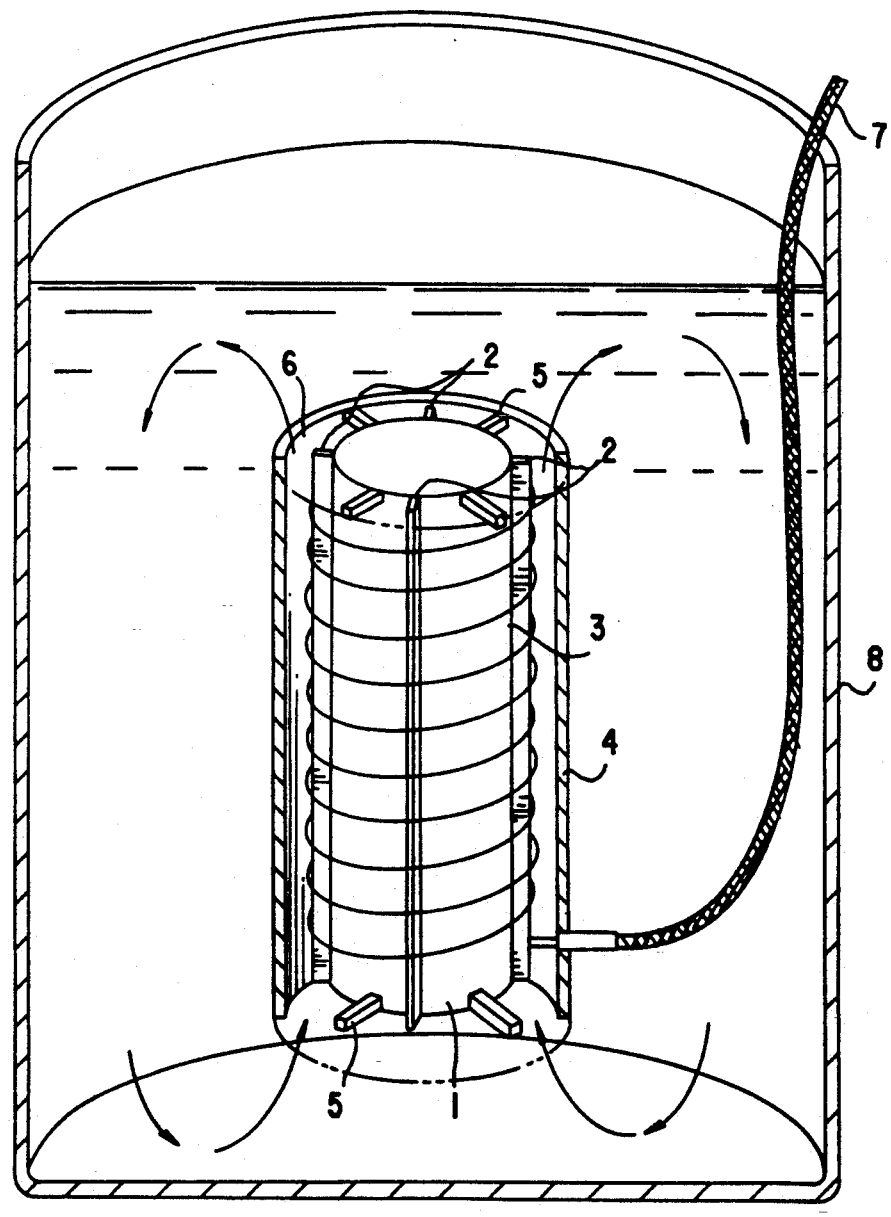
FIG. 1 is a partially cutaway schematic, perspective view showing one embodiment of the present invention.

The hollow fiber used in the present invention is made of a high molecular compound or polymer which generates air bubbles of about 0.1 to 0.3 mm in diameter in still water. Such a hollow fiber can be produced, for example, by the following spinning process. This process is merely one example, and is not intended to limit the hollow fiber spinning method used in the fine bubble generating apparatus of the present invention thereto.

To prepare a dope (mixture of a material to be formed into hollow fiber and a solvent thereof), 25% by weight of polysulfone P-1700 (made by Union carbide) was dissolved into N-methyl-2-pyrrolidone (made of Mitsubishi Kasei), and then as a hollowing agent, 1–10% by weight, preferably 3–5% by weight of ethylene glycol (which is referred to simply as "EG" hereinbelow) was added to the solution. Next, the dope containing EG added thereto was kept under vacuum for degassing, and then spinning was conducted by means of an ordinary double-tube type spinneret. At that time, water was used as the inside and outside solidifying liquid for the filament being extruded.

The above-mentioned spinning is usually conducted in a bath filled with water serving as the outside solidifying liquid, and the dry distance between the level of water in the bath and the spinneret should be in the range from 0 to 10 cm, preferably about 5 cm for operational convenience.

The hollow fiber which is taken out from the outside solidifying liquid is wound round a drum. If the winding speed is then increased, the hollow fiber is stretched so as to advance orientation of the polymer, which results in a hollow fiber having a dense structure which is hard to generate bubbles. In this process, two sets of take-up drums were disposed in series, and the present of draft (the ratio of actual fiber winding linear speed to the linear speed of the hollow fiber being extruded from the spinneret when stretching does not occur) was set at 1.0 in order to avoid stretching of the fiber when it was round around the first drum. The hollow fiber was wound round the first drum by one turn without causing any slip, and in the second drum the fiber winding speed was regulated to obtain a stretch ratio of 1.1 to 1.4.

This is to stretch the hollow fiber in a condition wherein it is not completely solidified yet, although solidification of the fiber occurs to some degree after commencement of the spinning operation.

Next, the hollow fiber was washed by water sufficiently, dried after complete solidification thereof, and then subjected to stretching at a stretch ratio of 1.0 to 1.3.

The hollow fiber thus produced has inner and outer surfaces, each of which is formed in a dense layer, and an intermediate portion comprised of a sponge-like carrier or support. The dense layer on the inner surface has a large number of fine holes having diameters of 100 Å and under, while the outer layer has numerous fine holes having diameters of several microns and under.

By supplying pressurized gas into the hollow fiber thus produced and which is immersed in a liquid such as water, it is possible to generate bubbles, 0.1 to 0.3 mm in diameter, through the outer surface of the fiber.

The present invention will now be described by way of several preferred embodiments thereof with reference to the accompanying drawings.

In the drawings, reference numeral 1 denotes an inner cylinder whose upper and lower ends are closed and which is 30 mm in outside diameter and 140 mm in length. The inner cylinder 1 has four pieces of longitudinally extending rod members 2 adhesively bonded onto the outer peripheral surface thereof at circumferentially equal intervals. Each of the rod members 2 has semi-circular grooves having a diameter of 1.2 mm formed on the outer surface thereof at a pitch of 5 mm in the longitudinal direction. A hollow fiber 3 is wound spirally along the grooves and fixedly secured thereto by means of an adhesive. Thus, the hollow fiber 3 is disposed spirally at portions spaced apart from the outer peripheral surface of the inner cylinder 1 by the thickness of the rod members 2. The overall length of the hollow fiber 3 was about 3 meters.

Reference numeral 4 denotes an outer cylinder having a diameter 20 mm larger than the outside diameter of the above-mentioned inner cylinder 1 and a length of 150 mm. The inner cylinder 1 having the hollow fiber 3 wound along the rod members thereof is inserted into the outer cylinder 4 such that both the cylinders 1 and 4 are coaxially disposed, and then fixedly secured by means of stays 5. Both the upper and lower ends of the outer cylinder 4 are open, and an annular passage 6 which is open in the upper and lower ends is formed between the inner cylinder 1 and the inner surface of the outer cylinder 4.

A pressurized air supply pipe 7 is airtightly connected to one end (or both ends) of the above-mentioned hollow fiber 3, and the other end on the unconnected side thereof is closed by a sealing material such as an adhesive or the like.

Further, while in this arrangement the pressurized air supply pipe 7 is connected to one end of the hollow fiber 3, as an alternative example to this embodiment, it is possible to connect the hollow fiber 3 wound round the inner cylinder 1 to the interior of the cylinder 1 and supply pressurized air into the latter. In this case, the hollow fiber 3 may be connected to the interior of the inner cylinder 1 at several places, instead of one place.

The fine bubble generating apparatus constructed as mentioned above is held by an appropriate holder means, not shown, in the central part of a vessel 8 having a diameter of about 150 mm and a height of 300 mm and filled with water with the lower end of the apparatus spaced apart by a distance of about 15 mm from the bottom of the vessel 8.

Pressurized air was supplied from a compressor (not shown) fitted with a pressure regulator into the pressurized air supply pipe 7 and the pressure of the pressurized air was gradually raised. When the pressure reached about 1.5 kg/cm² G, generation of bubbles on the outer surface of the hollow fiber 3 was observed. The bubbles became larger gradually, and when they grew to a certain size, they begun to rise all together away from the outer surface of the hollow fiber 3. The bubbles rose through the passage 6 formed between the inner cylinder 1 and the outer cylinder 4. Then, the rise of a large number of bubbles caused air lift phenomenon within the passage 6, which induced rising flow of water from the lower end of the passage 6 towards the upper end thereof.

The outer surface of the hollow fiber 3 located inside the passage 6 was exposed to the above-mentioned rising flow of water, and the bubbles which generated through the outer surface of the hollow fiber 3 begun to separate from the surface of the latter and rise when they were in extremely fine condition before they grew up to big sizes.

As a result of observation of the above-mentioned action from outside through the outer cylinder 4 made of a transparent material, it revealed that the diameters of bubbles generated through the outer surface of the hollow fiber 3 varied widely. The bubbles of small diameters having low rising speeds due to small buoyancy in water served as tracers visualizing the flow of water. While, when the pressure of pressurized air became more than 2 kg/cm² G where the amount of generation of bubbles increased and bubble rising speed increased by enhanced air effect in the passage 6, it was observed that fine bubbles out of the bubbles discharged from a bubble outlet formed in the upper part of the passage 6 were caused by the circulating flow of water to move down along the outside of the fine bubble generating apparatus and drawn in again through an inlet formed in the lower end of the passage 6.

In this embodiment, when the supply pressure of pressurized air became 3 kg/cm² G and over, the rising flow rate of bubbles due to air lift effect became insufficient for increased flow rate of generated bubbles, which resulted in promoted amalgamation of bubbles, and therefore the original object of reducing bubble diameters could not be achieved. This is because there is a limitation in the rising speed of bubbles obtainable through air lift effect. To make the mean bubble diameters as small as possible, it is necessary to conduct operation at a pressurized air pressure which is optimum for the bubble generating function of the hollow fiber itself and the construction of the fine bubble generating apparatus.

Figure 5:
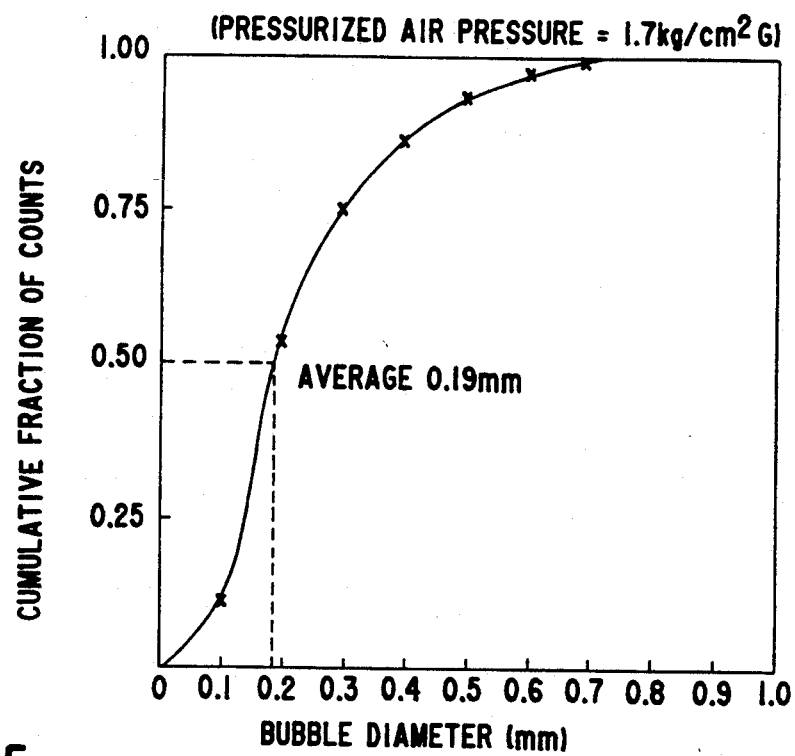
FIGS. 5, 6 and 7 are graphs showing diameters of fine bubbles generated by the embodiment shown in FIG. 1 under predetermined pressurized air pressures, respectively, in terms of cumulative fraction of counts or ogive.

In the above-mentioned embodiment, when the pressurized air pressure was set at 1.7 kg/cm² G, the flow rate of generated bubbles was 29 cc/min, and the mean bubble diameter was 0.19 mm. This mean bubble diameter was obtained from the bubble diameter distribution shown in FIG. 5 which was plotted from 500 pieces of samples through photographing by means of a stereoscopic microscope.

Figure 6:
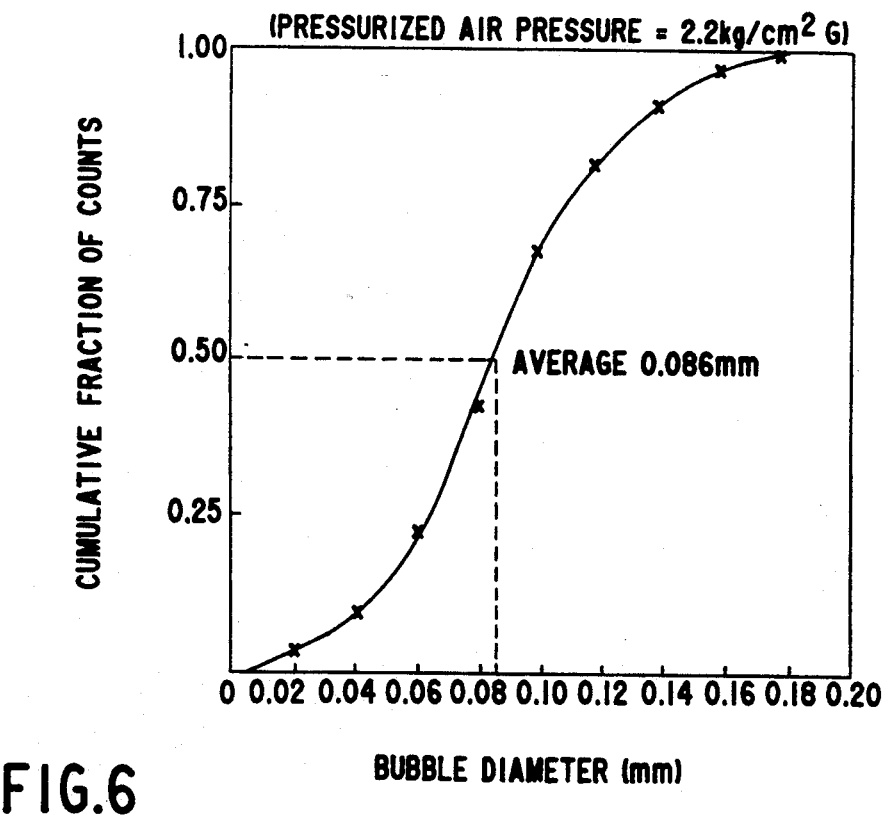

Further, when the pressurized air pressure was set at 2.2 kg/cm² G, the flow rate of generated bubbles was 68 cc/min, and the mean bubble diameter thereof was 0.086 mm. This mean bubble diameter was obtained from FIG. 6 which was plotted in the same manner as in FIG. 5.

Figure 7:
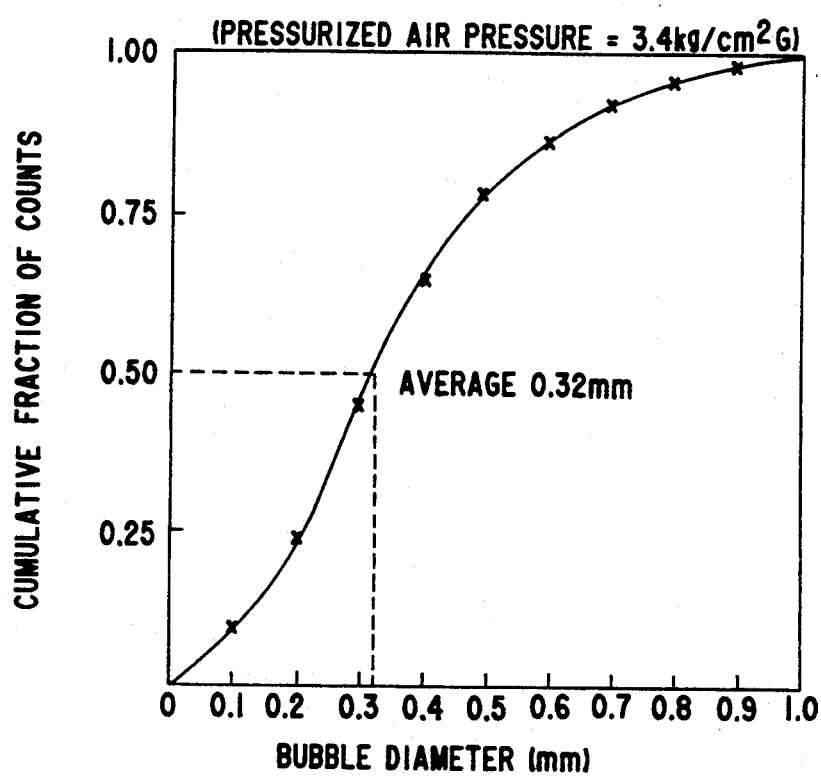

Whilst, when the pressured air pressure was set at 3.4 kg/cm² G, the flow rate of generated bubbles was .197 cc/min, and the mean bubble diameter was 0.32 m. The bubble diameter distribution obtained in this case was as shown in FIG. 7.

Generally speaking, even if it is tried to reduce diameters of bubbles to be generated through the outer surface of the hollow fiber by giving the liquid round the hollow fiber a running speed, the diameters of bubbles cannot be reduced as desired, because of formation of a boundary layer on the outer surface of the fiber which impedes the separation of bubbles generated on the surface thereof. However, by allowing the above-mentioned liquid to contact the hollow fiber at a predetermined angle (5 to 90 degrees), the adverse effect of the boundary layer on the separation of bubbles can be reduced.

Since in the above-mentioned embodiment the hollow fiber 3 is wound spirally round the inner cylinder 1, the hollow fiber 3 is disposed substantially at right angles to the flow of water rising through the passage 6 so that the fiber 3 is efficiently exposed to the rising current of water.

Further, in case the hollow fiber is disposed at an angle in the range of 5 to 90 degrees preferably of 45 to 90 degrees, more preferably of 75 to 90 degrees relative to the rising current of water, reduction in bubble diameters can be expected by the bubble separation effect due to the rising current of water.

COMPARATIVE EXAMPLE

A hollow fiber 3 which was produced at the same time as the fiber used in the above-mentioned embodiment was formed into the shape of a ring 25 cm long and connected airtightly to a pipe 9 made of acrylic resin thus forming a bubble generating apparatus, and then a pressurized air supply pipe 10 was connected to the acrylic pipe 9. Thereafter, pressurized air was supplied through the pipes 10 and 11 into the hollow fiber 3.

With the hollow fiber kept stationary, pressurized air was supplied through the acrylic pipe 9 into the hollow fiber 3. The mean bubble diameters obtained when the pressurized air pressure was set at 1.7 kg/cm$^2$ G, 2.2 kg/cm$^2$ G, and 3.4 kg/cm$^2$ G, respectively, were 0.2 mm, 0.24 mm, and 0.27 mm.

Figure 8:
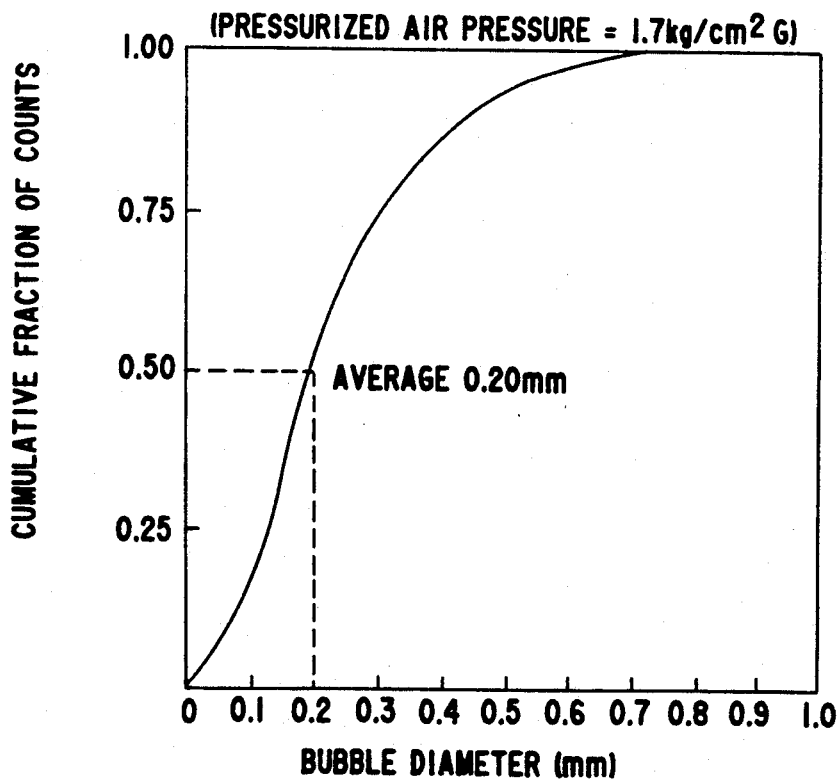
FIGS. 8, 9 and 10 are graphs showing diameters of fine bubbles generated by the comparative example under predetermined pressurized air pressures, respectively, in terms of cumulative fraction of counts.
Figure 9:
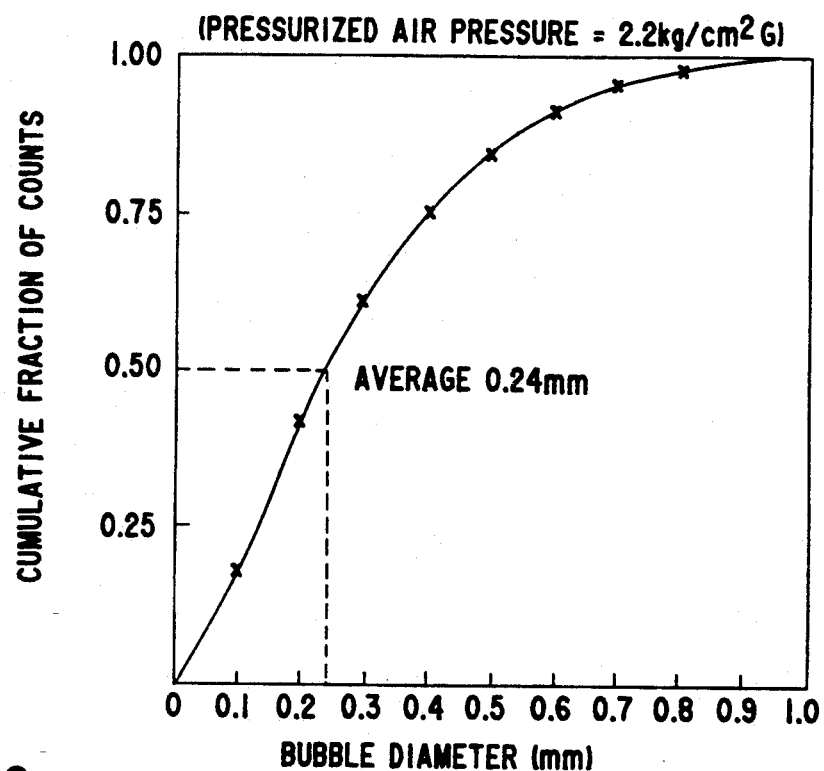
Figure 10:
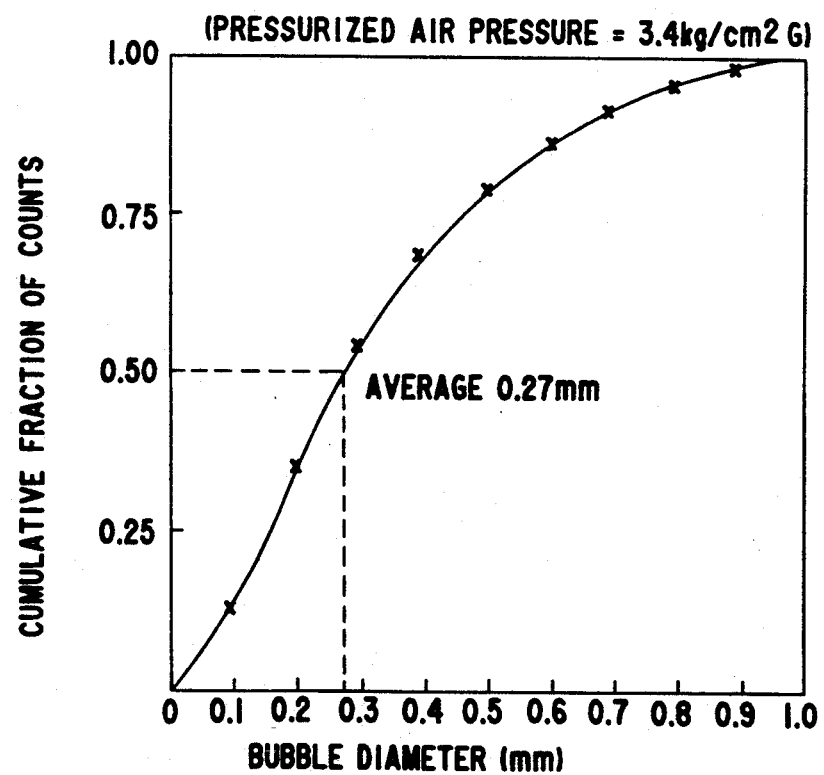

The bubble diameter distributions obtained at the above-mentioned pressurized air pressures, respectively, are shown in FIGS. 8, 9 and 10.

The above-mentioned embodiments are only examples of the present invention, and the configuration and dimensions of the component parts of the apparatus are not to be limited to those of these embodiments, and in particular the size thereof varies with the scale of the apparatus.

Further, as regards the component parts, the inner cylinder 1 and outer cylinder 4 need not always to be formed in a cylindrical shape. However, it is desirable that the cylinders 1 and 4 are of a similar figure.

Further, the fine bubble generating apparatus may be configured without the inner cylinder 1, one example of which is shown in FIGS. 2 and 3.

Stating in brief, a hollow fiber 3 formed in the shape of a ladder comprised of two vertical columnar portions on both sides thereof and a plurality of horizontally extending portions connected thereto is inserted in a rectangular member 11, which is open in the upper and lower ends and has a generally rectangular sectional shape, and fixedly secured by means of appropriate holder means, not shown, to the rectangular member 11 at a predetermined portion. A passage 6 which is open in the upper and lower ends is formed between the outer surface of the hollow fiber 3 and the inner surface of the rectangular member 11.

In this arrangement, pressurized air may be supplied into the hollow fiber 3 through respective one ends of the columnar portions on both sides, or through one end of one of the columnar portions whose respective other ends are closed.

The fine bubble generating apparatus of the present invention as shown in the above-mentioned embodiments can be used, for example, for supplying dissolved oxygen into an apparatus for cultivating and breeding a cell, a microorganism, an animal or a plant.

As described in detail hereinabove, in the fine bubble generating apparatus according to the present invention, when the supply of pressurized gas from the pressurized gas supply pipe into the hollow fiber is commenced, bubbles are generated through the outer surface of the pipe, and when the bubbles have grown up to a predetermined size, they will separate from the surface of the fiber and rise through the passage.

As a result, rising current of water will occur due to the rising of bubbles or air lift phenomenon so that the hollow fiber held inside the passage is exposed to the rising current of water, and the bubbles formed through the outer surface of the fiber will separate from the outer surface thereof in the form of fine bubbles before they grow up to a size available at the time of commencement of supply of pressurized air.

Further, even in case the liquid is given a running speed, the boundary layer formed on the outer surface of the hollow fiber impedes reduction in bubble diameters due to separation of bubbles from the surface of the fiber. However, the adverse effect of the boundary layer can be reduced by setting the angle of contact between the liquid and the hollow fiber in the range of 5 to 90 degrees.

What is claimed is:

1. A fine bubble generating apparatus comprising: a cylindrical device which is open in the upper and lower ends thereof and disposed in a liquid stored in a vessel, the lower end of the cylindrical device being spaced apart from the inner surface of the bottom of the vessel; a passage which is narrow in width and formed inside the cylindrical device so as to extend vertically and whose upper and lower ends are open; a hollow fiber which has a predetermined length and is inserted and held in the passage so as to be spaced apart from the inner surface of the passage and whose leading end is blocked; and a pressurized gas supply pipe connected to an open base end of the hollow fiber to supply pressurized gas into the interior of said fiber.

2. A fine bubble generating apparatus as claimed in claim 1, characterized in that said hollow fiber is disposd at an angle of 5 to 90 degrees relative to the longitudinal direction of said passage.

3. A fine bubble generating apparatus as claimed in claim 1, characterized in that said cylindrical device comprises an inner cylinder and an outer cylinder disposed coaxially so as to define said passage in annular form between the outer surface of the inner cylinder and the inner surface of the outer cylinder, said hollow fiber being disposed spirally in the annular passage so as to extend in the direction from the upper part of the inner cylinder to the lower part thereof.

4. A fine bubble generating apparatus as claimed in claim 3, characterized in that said inner cylinder is formed airtightly by blocking up the upper and lower ends thereof, said hollow fiber being connected through the air-tight inner cylinder to said pressurized air supply pipe.

5. A fine bubble generating apparatus as claimed in any one of claims 1 to 4, characterized in that said passage in which said hollow fiber is inserted and held is formed in a liquid stored in a liquid vessel for use in an apparatus for cultivating and breeding a cell, a microorganism, an animal or a plant, so as to extend vertically with the lower end of the passage spaced apart from the bottom surface of the liquid vessel.

* * * * *